(12) United States Patent
Dang

(10) Patent No.: US 10,393,858 B2
(45) Date of Patent: Aug. 27, 2019

(54) INTERACTIVE SPATIAL ORIENTATION METHOD AND SYSTEM

(71) Applicant: VR Technology (Shenzhen) Limited, Shenzhen, Guangdong (CN)

(72) Inventor: Shaojun Dang, Guangdong (CN)

(73) Assignee: VR Technology (Shenzhen) Limited, Shenzhen (CN)

( * ) Notice: Subject to any disclaimer, the term of this patent is extended or adjusted under 35 U.S.C. 154(b) by 0 days.

(21) Appl. No.: 16/239,480

(22) Filed: Jan. 3, 2019

(65) Prior Publication Data

US 2019/0137598 A1   May 9, 2019

Related U.S. Application Data

(63) Continuation of application No. 16/026,091, filed on Jul. 3, 2018, now Pat. No. 10,197,663, which is a continuation-in-part of application No. 15/355,093, filed on Nov. 18, 2016, now Pat. No. 10,088,295.

(30) Foreign Application Priority Data

Apr. 29, 2016   (CN) .......................... 2016 1 0281117

(51) Int. Cl.
    G01B 11/14   (2006.01)
    G01S 5/16    (2006.01)
    G01B 11/02   (2006.01)
    G01B 11/00   (2006.01)
(52) U.S. Cl.
    CPC ............ *G01S 5/163* (2013.01); *G01B 11/002* (2013.01); *G01B 11/026* (2013.01); *G01B 11/14* (2013.01)

(58) Field of Classification Search
    CPC .... G01J 3/02; G01J 3/28; G01J 3/2803; G01J 3/10; G01J 3/2823
    USPC ......................................................... 356/614
    See application file for complete search history.

(56) References Cited

U.S. PATENT DOCUMENTS

| 2009/0323121 A1* | 12/2009 | Valkenburg | .......... G01B 11/002 358/1.18 |
| 2014/0001875 A1* | 1/2014 | Nahidipour | ............. H02J 17/00 307/104 |
| 2014/0206381 A1* | 7/2014 | Yamada | ..................... G01S 5/14 455/456.1 |
| 2014/0368378 A1* | 12/2014 | Crain | ........................ G01S 5/02 342/25 A |

* cited by examiner

*Primary Examiner* — Md M Rahman

(57) ABSTRACT

Disclosed is an interactive spatial orientation method and system. The method includes: sequentially scanning, by a scanning apparatus, a receiving apparatus in a first direction and a second direction perpendicular to each other; converting, by the receiving apparatus, received optical signals generated from the first scanning and the second scanning into radio waves carrying results of the first scanning and the second scanning, and transferring the radio waves to a processing apparatus; synthesizing, by the processing apparatus, the results of the first scanning and the second scanning to obtain six degrees of freedom information of the receiving apparatus. The system includes a scanning apparatus; a receiving apparatus; and a processing apparatus.

14 Claims, 7 Drawing Sheets

INTERACTIVE SPATIAL ORIENTATION METHOD AND SYSTEM

CROSS REFERENCE TO RELATED APPLICATIONS

This application is a Continuation Application of U.S. patent application Ser. No. 16/026,091 filed on Jul. 3, 2018 which is a Continuation-In-Part Application of U.S. patent application Ser. No. 15/355,093 filed on Nov. 18, 2016 which claims the benefit of Chinese Patent Application No. 201610281117.0 filed on Apr. 29, 2016. All the above are hereby incorporated by reference.

TECHNICAL FIELD

The present application relates to the field of spatial orientation, and more particularly relates to an interactive spatial orientation method and system.

BACKGROUND OF THE APPLICATION

Spatial orientation generally uses an optical or ultrasonic mode for positioning and measuring, and derives the spatial position of an object to be measured by building models. A general optical spatial orientation system determines the spatial position of an object by using a laser for scanning and a light sensor for receiving. This kind of spatial orientation system tends to consist of large measuring equipments, and have long measurement time and poor capability of real-time measurements, thus substantially limiting the application.

SUMMARY OF THE APPLICATION

There is provided an interactive spatial orientation method, including: sequentially scanning, by a scanning apparatus, a receiving apparatus in a first direction and a second direction perpendicular to each other; converting, by the receiving apparatus, received optical signals generated from the first scanning and the second scanning into radio waves carrying results of the first scanning and the second scanning, and transferring the radio waves to a processing apparatus; synthesizing, by the processing apparatus, the results of the first scanning and the second scanning to obtain six degrees of freedom information of the receiving apparatus.

The interactive spatial orientation method may include: firstly emitting, by the scanning apparatus, a first laser plane to scan an area to be scanned in the first direction, a starting time $t_0$ of the first scanning being recorded to be $t_0=0$, and a first scanning function representing a relationship between a scan angle $\varphi$ of the first scanning and a scan time t of the first scanning being $\varphi=f(t)$; receiving, by the receiving apparatus comprising an optical signal receiving module array matrix, a first laser signal generated from the first scanning, recording a receiving time $t_\varphi$ as $t_\varphi=(t_1, t_2, \ldots, t_n)$, and transferring a result of the first scanning to the processing apparatus; receiving, by the processing apparatus, the result of the first scanning; secondly emitting, by the scanning apparatus, a second laser plane to scan the area to be scanned in the second direction perpendicular to the first direction, a starting time $t_0$ of the second scanning being recorded, and a second scanning function representing a relationship between a scan angle $\psi$ of the second scanning and a scan time t' of the second scanning being $\psi=g(t'-t'_0)$; receiving, by the receiving apparatus, a second laser signal generated from the second scanning, recording a receiving time $t'_\psi$ as $t'_\psi=(t'_1, t'_2, \ldots, t'_n)$, and transferring a result of the second scanning to the processing apparatus; receiving, by the processing apparatus, the result of the second scanning; calculating, by the processing apparatus, a coordinate array $(\varphi, \psi)$ according to following functions:

$$\varphi=f(t_\varphi),$$

$$\psi=g(t'_\psi-t'_0),$$

and reversely calculating position and orientation information of the scanning apparatus to obtain the six degrees of freedom information of the receiving apparatus based on the optical signal receiving module array matrix.

The interactive spatial orientation method may further include: determining, by the processing apparatus, a key scan area according to the six degrees of freedom information of the receiving apparatus; obtaining, by the processing apparatus, nonlinear functions $\varphi'$, $\psi'$ matching the key scan area and previously saved in the processing apparatus; replacing, by the processing apparatus, the first scanning function and the second scanning function with the nonlinear functions $\varphi'$, $\psi'$, respectively; and re-executing the first scanning and the second scanning to obtain updated six degrees of freedom information of the receiving apparatus.

The interactive spatial orientation method may further include: determining, by the processing apparatus, a key scan area according to the six degrees of freedom information of the receiving apparatus; generating, by the processing apparatus, nonlinear functions $\varphi''$, $\psi''$ according to the key scan area and rules set in advance; replacing, by the processing apparatus, the first scanning function and the second scanning function with the nonlinear functions $\varphi''$, $\psi''$, respectively; and re-executing the first scanning and the second scanning to obtain updated six degrees of freedom information of the receiving apparatus.

There is also provided an interactive spatial orientation system, including: a scanning apparatus; a receiving apparatus; and a processing apparatus, wherein the scanning apparatus sequentially scans the receiving apparatus in a first direction and a second direction perpendicular to each other; the receiving apparatus converts received optical signals generated from the first scanning and the second scanning into radio waves carrying results of the first scanning and the second scanning, and transfers the radio waves to the processing apparatus; and the processing apparatus synthesizes the results of the first scanning and the second scanning to obtain six degrees of freedom information of the receiving apparatus.

The scanning apparatus may include a longitude scanning device and a latitude scanning device; and the longitude scanning device and the latitude scanning device each may include: a synchronizing module; an emitting side embedded control module; a drive circuit; a laser source; and a scanning module; wherein the drive circuit is electrically connected with the laser source and the emitting side embedded control module respectively; the emitting side embedded control module is electrically connected with the synchronizing device; and the scanning module is electrically connected with the laser source and the drive circuit respectively; and the synchronizing module of the longitude scanning device and the synchronizing module of the latitude scanning device are electrically connected with each other and synchronize related information.

The longitude scanning device and the latitude scanning device each may further include a flash light electrically connected with the drive circuit, and the flash light flashes at a beginning of a scan cycle.

The laser source may include a laser device emitting a laser; and an optical shaping system; wherein the laser emitted by the laser device is arranged in the optical shaping system to form a laser plane.

The scanning module may reflect the laser plane to enter into an area to be scanned.

The scanning module may include a rotating polyhedron with reflective properties on a surface and rotating along at least one rotary shaft.

The scanning module may further include an exit light processing module; and the exit light processing module processes an exit light exit from the rotating polyhedron and changes a light path of the exit light.

The scanning module may include a scanning galvanometer rotating or vibrating along at least one rotary shaft respectively.

The scanning module may further include an exit light processing module; and the exit light processing module processes an exit light exit from the scanning galvanometer and changes a light path of the exit light.

The scanning module may include a microelectromechanical mirror.

The scanning module may further include an exit light processing module; and the exit light processing module processes an exit light exit from microelectromechanical mirror and changes a light path of the exit light.

The microelectromechanical mirror may include: a fixed plane with an outer ring; and a rotating circular mirror set up on the fixed plane; wherein the outer ring on the fixed plane and the rotating circular mirror form a comb-shaped driver; and an angle between the rotating circular mirror and the fixed plane is changed by controlling a current inputting the driver.

The microelectromechanical mirror may be a two-dimension controllable microelectromechanical mirror; and the two-dimension controllable microelectromechanical mirror may include: a two-dimension rotating circular mirror; and two outer rings nestedly set up on the position in which the two-dimension rotating circular mirror is located.

The receiving apparatus may include: a receiving side embedded control module; an optical signal receiving module array; a receiving side wireless transmission module; and a power module; wherein the receiving side embedded control module is electrically connected with the optical signal receiving module array, the power module, and the receiving side wireless transmission module respectively; and the receiver wireless transmission module is electrically connected with the power module.

The optical signal receiving module array may include at least 12 sensors, and the sensors are set up in a way that at least 4 sensors are not in the same plane no matter what angle the sensors project.

The processing apparatus may include a processing side wireless transmission module and a calculation processor; wherein the processing side wireless transmission module is electrically connected with the calculation processor.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

The present application provides an interactive spatial orientation method and system with simple equipments and shorter measuring time, aiming at the drawback of the current spatial orientation with miscellaneous equipment and long measuring time.

To make the technical feature, objective and effect of the present application be understood more clearly, now the specific implementation of the present application is described in detail with reference to the accompanying drawings and embodiments.

Figure 1:
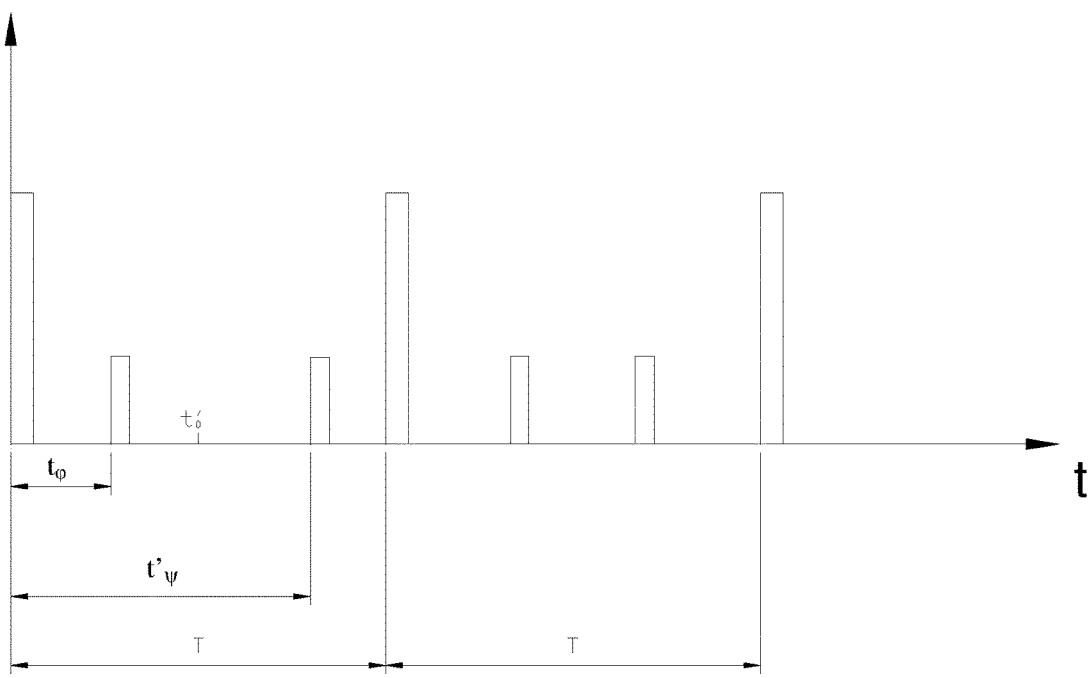
FIG. 1 is a schematic diagram of the interactive spatial orientation method and system according to an illustrative embodiment of the present application.

FIG. 1 is a schematic diagram of the interactive spatial orientation method and system according to the present application. In the axes, the horizontal axis represents the time t, and the vertical axis represents the light intensity lx. When the measurement is started, a flash signal is given, and the receiving apparatus receives an optical signal with a light intensity that is far greater than or far less than the light intensity of the measured laser. The flash signal is mainly used to determine the measurement period, so the light intensity of the flash signal is required to be distinguished from the light intensity of the measured laser. The longitude measurement is firstly done after the flash is completed. The scan is conducted referring to the function $\varphi=f(t)$ which represents the relationship between the scan angle and the scan time and is pre-defined. During the measurement, a measuring time $t_\varphi$ is recorded after the receiving apparatus receives the measured laser signal. A latitude measurement which is similar to the longitude measurement is carried out after completion of the longitude measurement. The starting time of the measurement is recorded to be $t'_0$, and the scan is conducted referring to the function $\psi=g(t'-t'_0)$ which represents the relationship between the scan angle and the scan time. A measuring time $t'_\psi$ is recorded after the receiving apparatus receives the measured laser signal. The scan angles $\varphi$ and $\psi$ are calculated by substituting the measured data $t_\varphi$ and $t'_\psi$ into the functions $\varphi=f(t_\varphi)$ and $\psi=g(t'_\psi-t'_0)$. Based on an optical signal receiving apparatus array matrix, the position and orientation information of the scanning apparatus is reversely calculated to get the six degrees of freedom information of the receiving apparatus. According to the calculation, in order to obtain the six degrees of freedom information of the receiving apparatus, it is required that at least 4 sensors are not in the same plane to transfer data. To ensure that the six degrees of freedom information can be measured in the scan range regardless of the orientation of the receiving apparatus, it is required that at least 4 sensors are not in the same plane no matter what angle the sensors project. According to the calculation, at least 12 sensors need to be set up on the receiving apparatus.

Figure 2:
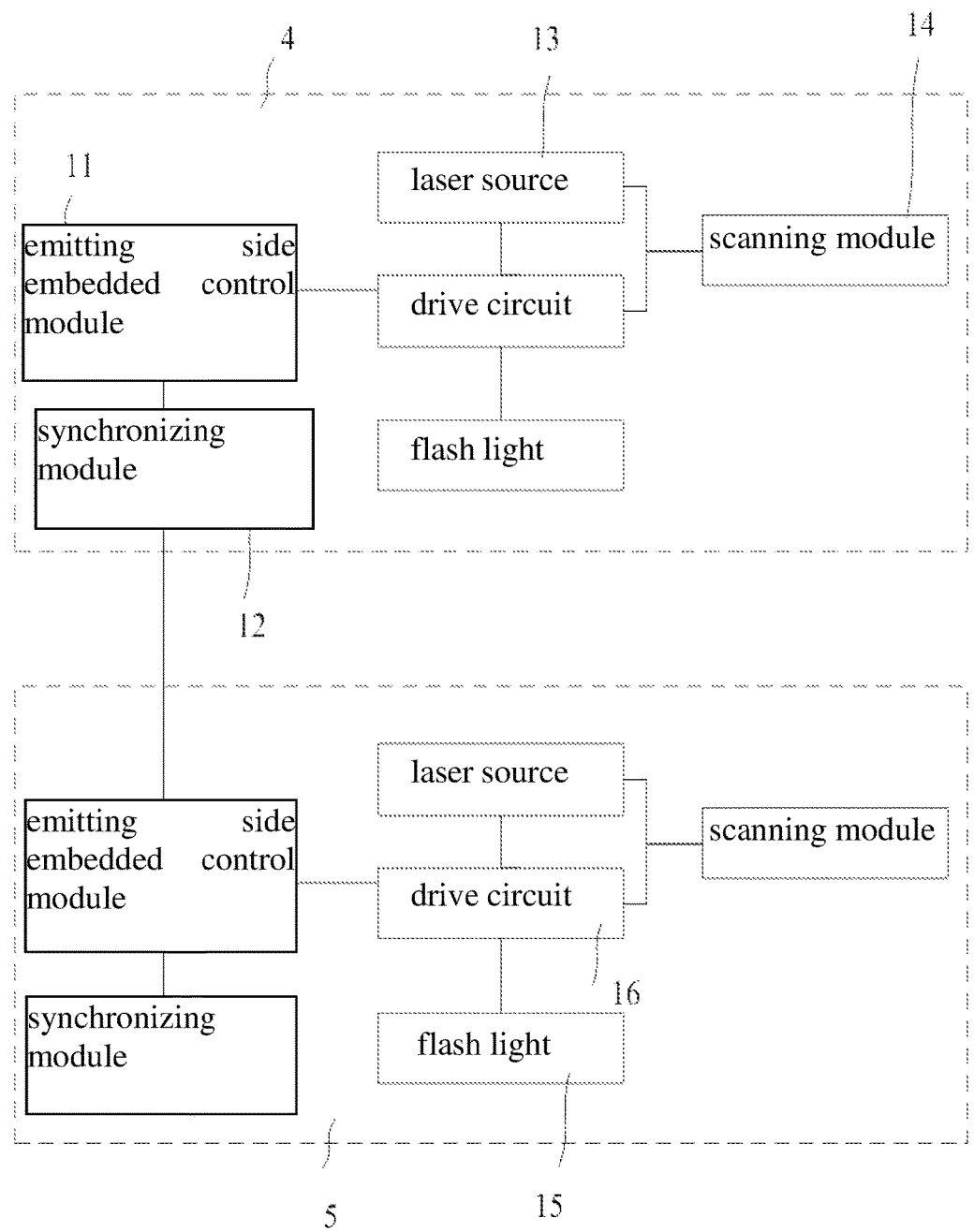
FIG. 2 is a structure schematic diagram of the scanning apparatus of the interactive spatial orientation method and system according to an illustrative embodiment of the present application.
Figure 3:
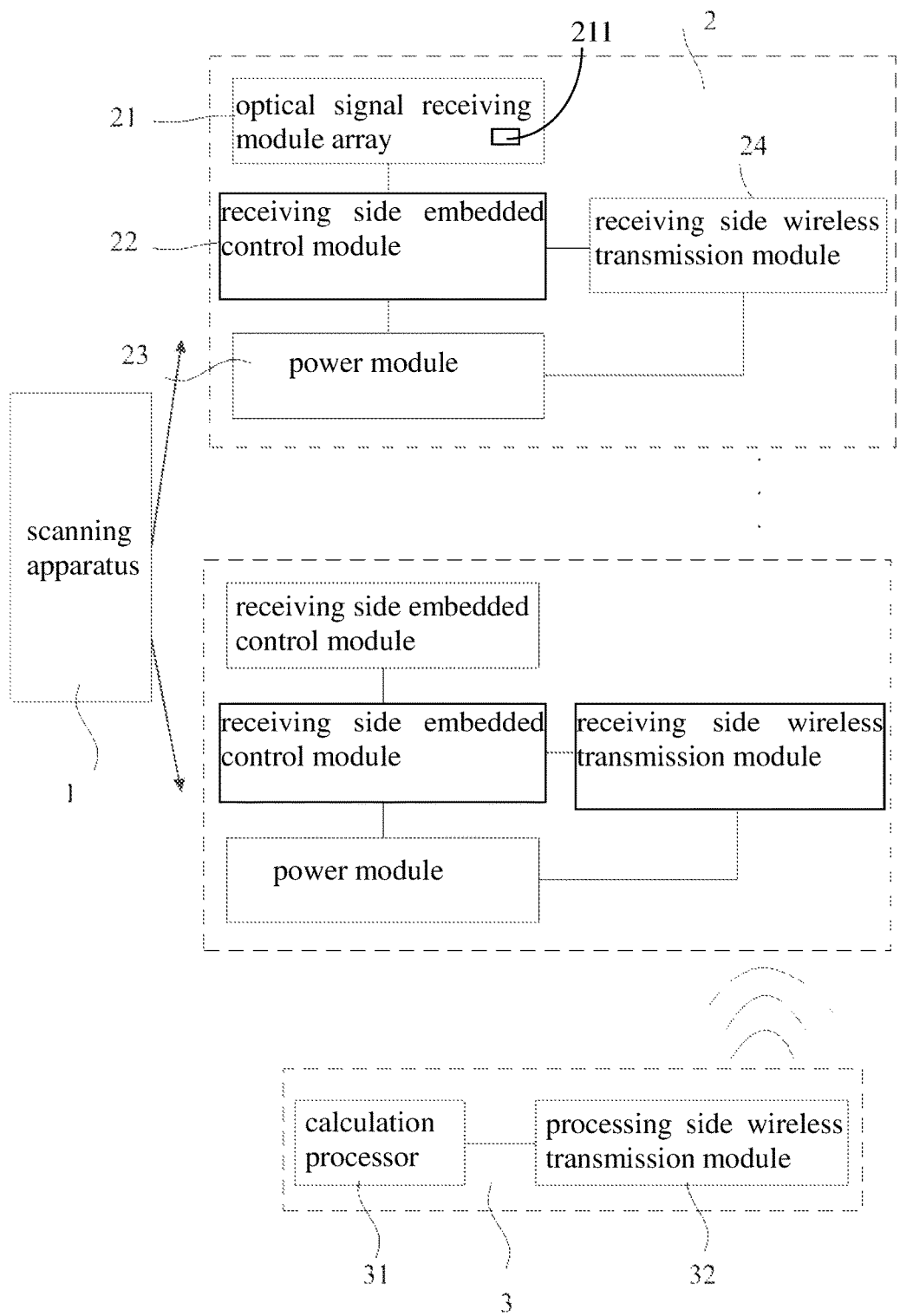
FIG. 3 is a structure schematic diagram of the interactive spatial orientation method and system according to an illustrative embodiment of the present application.

Referring to FIG. 2 to FIG. 3, the interactive spatial orientation system of the present application comprises a scanning apparatus 1, a receiving apparatus 2 and a processing apparatus 3. The scanning apparatus 1 comprises a longitude scanning device 4 and a latitude scanning device 5. The internal structures of the longitude scanning device 4 and the latitude scanning device 5 are the same, but the scan directions are different. Normally, the angle between the scan direction of the longitude scanning device 4 and the scan direction of the latitude scanning device 5 is 90°. Information is transmitted between the longitude scanning device 4 and the latitude scanning device 5 via their synchronizing modules 12. The longitude scanning device 4 and the latitude scanning device 5 respectively comprise an emitting side embedded control module 11, a drive circuit 16, a laser source 13 and a scanning module 14. The scanning module 14 is electrically connected with the laser source 13 and the drive circuit 16 respectively. The drive circuit 16 is electrically connected with the laser source 13 and the emitting side embedded control module 11 respectively. The emitting side embedded control module 11 is electrically connected with the synchronizing module 12.

The receiving apparatus 2 comprises a receiving side embedded control module 22, an optical signal receiving module array 21, a receiving side wireless transmission module 24 (transceiver), and a power module 23. The optical signal receiving module array 21 is configured for receiving the optical signal, and comprises at least 12 optical sensors 211. The 12 optical sensors are set up on the surface of the receiving apparatus in a way that at least 4 sensor are not in the same plane no matter what angle the sensors project. The receiving side embedded control module 22 is electrically connected with the optical signal receiving module array 21, the power module 23, and the receiving side wireless transmission module 24 respectively. The receiving side wireless transmission module 24 is electrically connected with the power module 23.

The processing apparatus 3 comprises a processing side wireless transmission module 32 and a calculation processor 31. The processing side wireless transmission module 32 is electrically connected with the calculation processor 31. The processing side wireless transmission module 32 and the receiving side wireless transmission module 24 communicate to each other by wireless means.

As shown in FIG. 2, a flash light 15 for flashing can be added. Under the control of the processing apparatus 3 or the scanning apparatus 1, the flash light 15 begins to scan at the beginning of the scan cycle.

The working process of the interactive spatial orientation system of the present application is as follows:

firstly, the flash light 15 flashes at the beginning of the scan, and at the same time the longitude scanning device 4 emits a laser plane to scan the area to be scanned, and records the scan starting time to be $t_0=0$; the relationship between the scan angle and the scan time is $\varphi=f(t)$; the optical signal receiving module array 21 receives the laser signal, and transmits an electrical signal to the receiving side embedded control module 22; the receiving side embedded control module 22 records the receiving time to be $t_\varphi=(t_1, t_2, \ldots, t_n)$, and transfers related information to the processing apparatus 3 via the receiving side wireless transmission module 24; via the processing side wireless transmission module 32, the processing apparatus 3 receives the signal transferred by the receiving side wireless transmission module 24; the scanning process of the latitude scanning device 5 is similar to that of the longitude scanning device 4, and the differences are listed as follows:

the scan direction of the latitude scanning device 5 is perpendicular to the scan direction of the longitude scanning device 4; the scan starting time is recorded to be $t'_0$; the relationship between the scan angle and the scan time of the latitude scanning apparatus 5 is recorded to be $\psi=g(t'-t'_0)$; the receiving side embedded control module 22 records the receiving time to be $t'_\psi=(t'_1, t'_2, \ldots, t'_n)$. The calculation processor 31 calculates a coordinate array $(\varphi, \psi)$ according to the following function:

$$\varphi=f(t_\varphi),$$

$$\psi=g(t'_\psi-t'_0)$$

and based on a known optical signal receiving module array matrix 21, reversely calculates the position and orientation information of the scanning apparatus 1 to get the six degrees of freedom information of the receiving apparatus 2.

After calculating the six degrees of freedom information of the receiving apparatus 2, according to the six degrees of freedom information of the receiving apparatus 2, the calculation processor 31 determines a key scan area, and obtains nonlinear scanning functions $\varphi'$, $\psi'$ matching the key scan area and previously saved in the processing apparatus 3, or according to the key scan area and rules set in advance, generates nonlinear scanning functions $\varphi''$, $\psi''$. A common rule is that the angle range needed to be scanned is obtained from the angle range of the receiving apparatus 2 and the angle value calculated by the maximum possible moving distance of the receiving apparatus in the scanning time. Beyond the angle range needed to be scanned, the scanning apparatus scans with the fastest speed, and within the angle range needed to be scanned, the scanning apparatus scans with a normal scan speed.

The scanning functions $\varphi=f(t)$ and $\psi=g(t'-t'_0)$ for last scan are replaced with the updated scanning functions $\varphi'$, $\psi'$ or $\varphi''$, $\psi''$, and a scan is re-executed.

By constantly updating the scanning functions, the scanning efficiency can be improved greatly, and the accuracy of the scanning can be improved.

Figure 4:
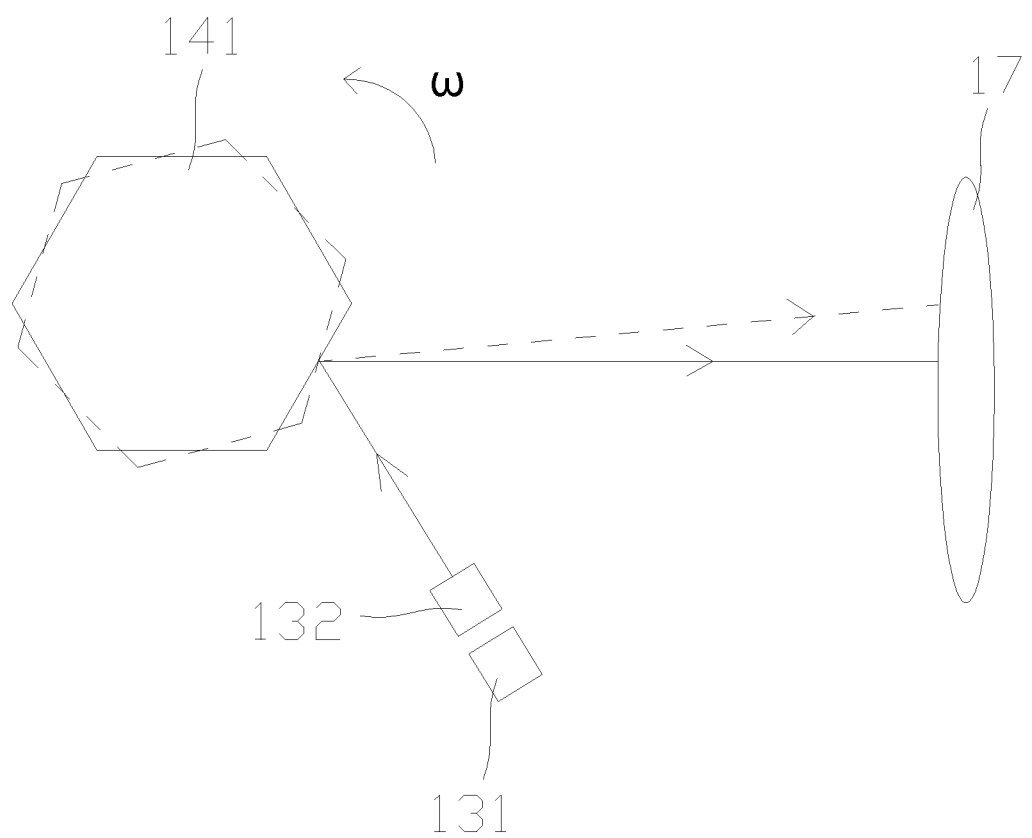
FIG. 4 is a diagram of the scanning module of the interactive spatial orientation method and system according to the first embodiment of the present application.

Now referring to FIG. 4, FIG. 4 is the schematic diagram of the scanning module 14 according to a first embodiment. Since the structure of the longitude scanning device 4 is the same as that of the latitude scanning device 5, only the structure of the longitude scanning device 4 is described here. The laser source 13 comprises a laser device 131 and an optical shaping system 132. The laser emitted by the laser device 131 is arranged in the optical shaping system 132 to form the needed light path, for example, the laser can be arranged to form a laser plane. The laser enters into the rotating polyhedron 141 along the light path. The rotating polyhedron 141 is a polyhedron with reflective properties on the surface and can rotate along at least one rotary shaft. When there is only one rotary shaft, it can scan in one direction; if there are two rotary shafts perpendicular to each other, it can scan in two directions perpendicular to each other by adjusting the incident light. After reflecting by the surface of the rotating polyhedron 141, the incident laser is emitted out of the scanning apparatus 1 and enters into the area to be scanned. With the rotation of the rotating polyhedron 141, the light exit angle exited from the scanning apparatus 1 is constantly changing, and the scanning range is covered. In order to further change the exit angle of the exit light, an exit light processing module 17 (e.g., a lens) can be set up in front of the scanning module 14 to further process the exit light.

Figure 5:
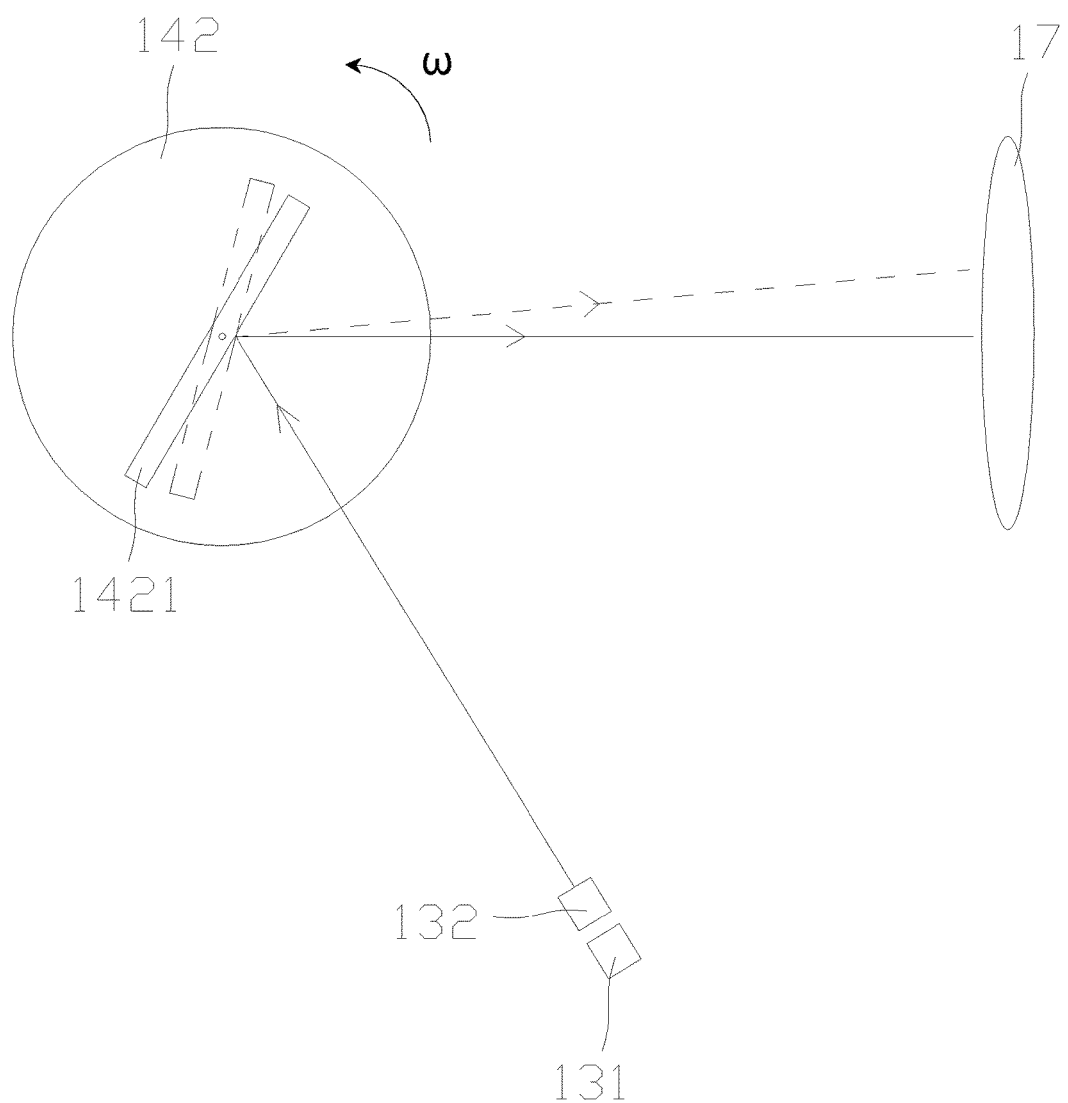
FIG. 5 is a diagram of the scanning module of the interactive spatial orientation method and system according to the second embodiment of the present application.

Now referring to FIG. 5, FIG. 5 is the schematic diagram of the scanning module 14 according to a second embodiment. The structure of the scanning module 14 of the second embodiment is basically the same as that of the first embodiment. The difference is that in the second embodiment a scanning galvanometer 142 is used to replace the rotating polyhedron 141 which is slightly larger in volume. The scanning galvanometer 142 comprises a galvanometer 1421 with reflective properties on the surface. By controlling the vibration or rotation of the galvanometer 1421, the scanning galvanometer 142 can change the light path of the light emitted by the laser source 13. The scanning galvanometer 142 can also rotate or vibrate along at least one rotating shaft.

Figure 6:
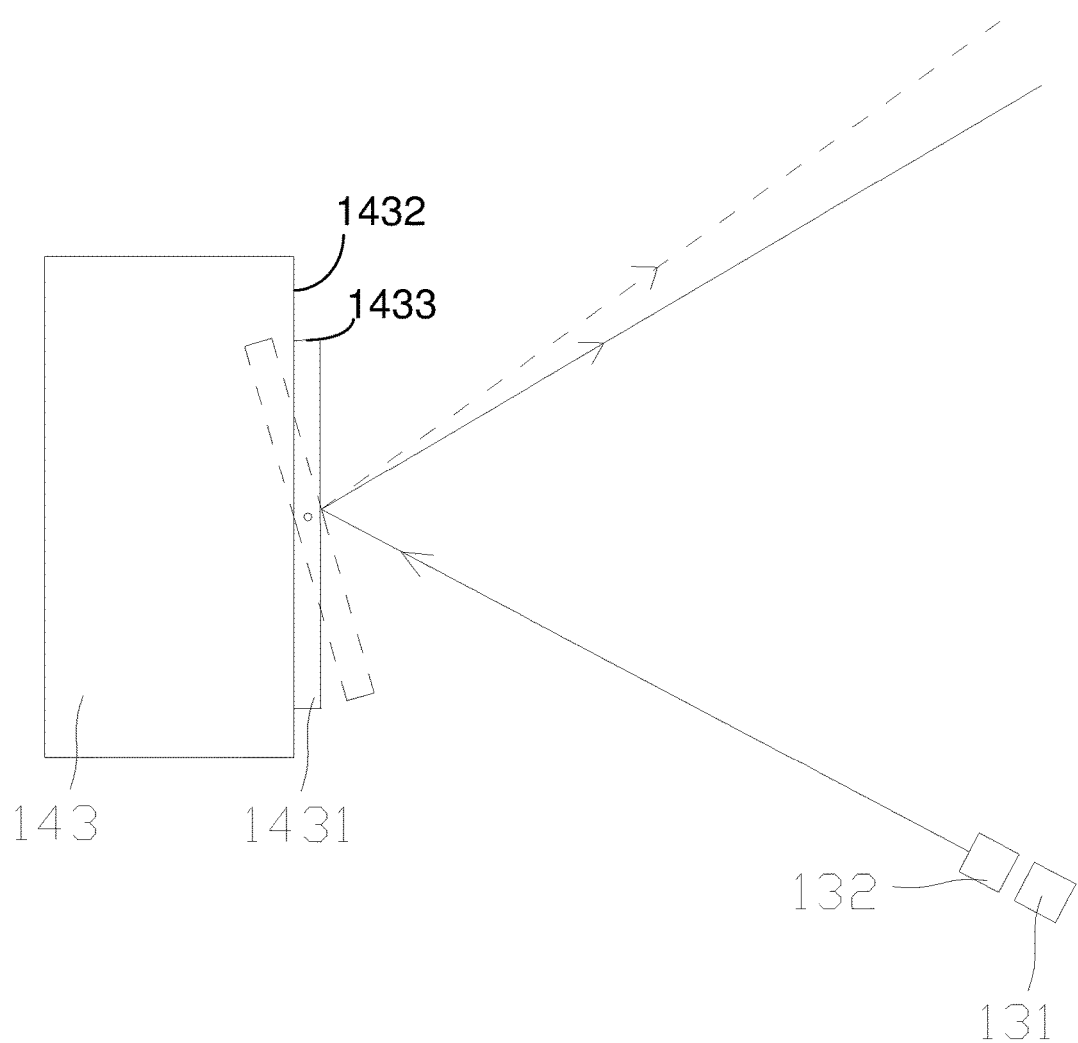
FIG. 6 is a diagram of the scanning module of the interactive spatial orientation method and system according to the third embodiment of the present application.

Now referring to FIG. 6, FIG. 6 is the schematic diagram of the scanning module 14 according to a third embodiment. The structure of the scanning module 14 of the third embodiment is basically the same as that of the first embodiment. The difference is that in the third embodiment the microelectromechanical mirror 143 is used to replace the rotating polyhedron 141 which is slightly larger in volume. The microelectromechanical mirror 143 comprises a rotatable circular mirror 1431 set up on a fixed plane 1432 with an outer ring 1433. The outer ring 1433 on the fixed plane 1432 and the rotating circular mirror 1431 form a comb-shaped driver. By controlling the current inputting the driver, the angle between the rotating circular mirror 1431 and the fixed plane 1432 can be changed to achieve the effect of one dimensional rotation control. The control frequency is up to 1000 Hz. This kind of precise control and high control frequency is very important in nonlinear scanning, which can not only realize the complex nonlinear function scanning, but also shorten the scan time and greatly reduce the scanning error.

Figure 7:
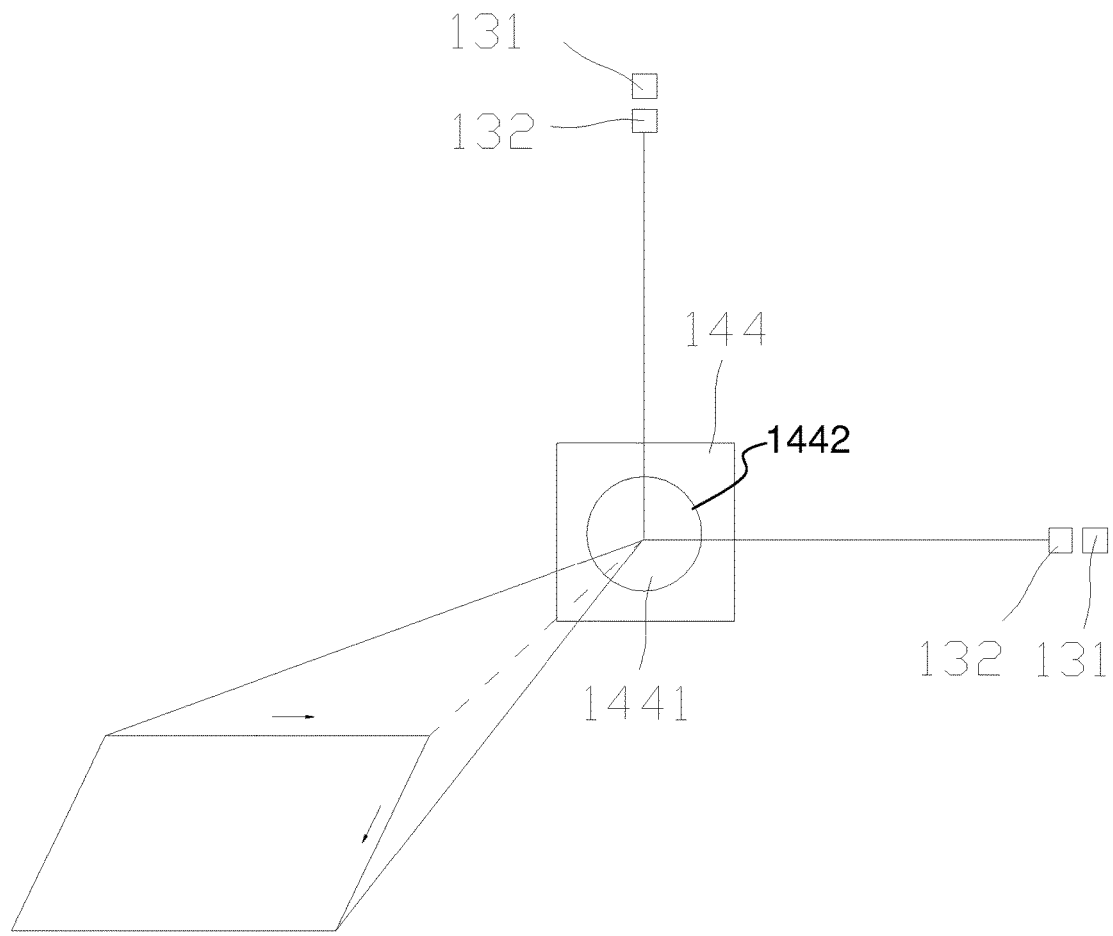
FIG. 7 is a diagram of the scanning module of the interactive spatial orientation method and system according to the fourth embodiment of the present application.

Now referring to FIG. 7, FIG. 7 is the schematic diagram of the scanning module 14 according to a fourth embodiment. In the fourth embodiment, the scanning module of the longitude scanning device 4 and the scanning module of the latitude scanning device 5 are made to be one, namely, a 2D controllable microelectromechanical mirror 144. There is an angle between the two sets of the laser source 13, and the emitted laser enters into the 2D controllable microelectromechanical mirror 144 respectively. The 2D controllable microelectromechanical mirror 144 nestedly set up two outer rings 1442 on the position in which the 2D rotating circular mirror 1441 is located to realize the scanning control of two dimensions by only one 2D rotating circular mirror 1441. After reflecting by the 2D rotating circular mirror 1441, the incident laser is emitted out of the scanning apparatus 1 and enters into the area to be scanned.

Compared with the prior art, the invention simplifies the calculation by scanning along the longitude direction and the latitude direction respectively and sequentially, and the number of measuring instruments is reduced and the structure becomes simpler. A lot of scanning time is saved by the nonlinear scanning method. Scanning instruments can skip some area where the target cannot exist and focus on the scanning of the area where the target may exist, which greatly improves the efficiency of scanning and real-time performance of the spatial orientation. The mass of the rotating body becomes small by using the rotating polyhedron 141, the scanning galvanometer 142 and the microelectromechanical mirror 143, which is helpful in reducing a centrifugal force generated by the rotation or the vibration and increasing the stability of the equipment. The quantity of the rotating body is reduced to 1 by using the 2D controllable microelectromechanical mirror 144, which further simplifies the device. The periodic flash of the flash light allows the system to better determine the scan cycle and prevents data confusion between different periods. The exit light processing module 17 can increase or decrease the exit angle of the exit laser, and enlarge the range of the scanning.

While the embodiments of the present application are described with reference to the accompanying drawings above, the present application is not limited to the above-mentioned specific implementations. In fact, the above-mentioned specific implementations are intended to be exemplary not to be limiting. In the inspiration of the present application, those ordinary skills in the art can also make many modifications without breaking away from the subject of the present application and the protection scope of the claims. All these modifications belong to the protection of the present application.

What is claimed is:

1. An interactive spatial orientation system, comprising:
   a scanning apparatus;
   a receiving apparatus; and
   a processing apparatus;
   wherein the scanning apparatus sequentially scans the receiving apparatus in a first direction and a second direction perpendicular to each other;
   the receiving apparatus converts received optical signals generated from the first scanning and the second scanning into radio waves carrying results of the first scanning and the second scanning, and transfers the radio waves to the processing apparatus; and
   the processing apparatus synthesizes the results of the first scanning and the second scanning to obtain six degrees of freedom information of the receiving apparatus;
   wherein the receiving apparatus comprises:
   a receiving side embedded controller;
   a sensor array;
   a receiving side wireless transceiver; and
   a power;
   wherein the receiving side embedded controller is electrically connected with the sensor array, the power, and the receiving side wireless transceiver respectively; and the receiver wireless transceiver is electrically connected with the power; and
   wherein the sensor array comprises at least 12 sensors, and the sensors are set up in a way that at least 4 sensors are not in the same plane no matter what angle the sensors project.

2. The interactive spatial orientation system according to claim 1, wherein the scanning apparatus comprises a longitude scanning device and a latitude scanning device; and the longitude scanning device and the latitude scanning device each comprises:
   a synchronizing device;
   an emitting side embedded controller;
   a drive circuit;
   a laser source; and
   a scanning instrument;
   wherein the drive circuit is electrically connected with the laser source and the emitting side embedded controller respectively; the emitting side embedded controller is electrically connected with the synchronizing device;

and the scanning instrument is electrically connected with the laser source and the drive circuit respectively; and the synchronizing device of the longitude scanning device and the synchronizing device of the latitude scanning device are electrically connected with each other and synchronize related information.

3. The interactive spatial orientation system according to claim 2, wherein the longitude scanning device and the latitude scanning device each further comprises a flash light electrically connected with the drive circuit, and the flash light flashes at a beginning of a scan cycle.

4. The interactive spatial orientation system according to claim 2, wherein the laser source comprises:
a laser device emitting a laser; and
an optical shaping system;
wherein the laser emitted by the laser device is arranged in the optical shaping system to form a laser plane.

5. The interactive spatial orientation system according to claim 4, wherein the scanning instrument reflects the laser plane to enter into an area to be scanned.

6. The interactive spatial orientation system according to claim 5, wherein the scanning instrument comprises a rotating polyhedron with reflective properties on a surface and rotating along at least one rotary shaft.

7. The interactive spatial orientation system according to claim 6, wherein the scanning instrument further comprises a lens for exit light processing; and the lens for exit light processing processes an exit light exit from the rotating polyhedron and changes a light path of the exit light.

8. The interactive spatial orientation system according to claim 5, wherein the scanning instrument comprises a scanning galvanometer rotating or vibrating along at least one rotary shaft respectively.

9. The interactive spatial orientation system according to claim 8, wherein the scanning instrument further comprises a lens for exit light processing; and the lens for exit light processing processes an exit light exit from the scanning galvanometer and changes a light path of the exit light.

10. The interactive spatial orientation system according to claim 5, wherein the scanning instrument comprises a microelectromechanical mirror.

11. The interactive spatial orientation system according to claim 10, wherein the scanning instrument further comprises a lens for exit light processing; and the lens for exit light processing processes an exit light exit from microelectromechanical mirror and changes a light path of the exit light.

12. The interactive spatial orientation system according to claim 10, wherein the microelectromechanical mirror comprises:
a fixed plane with an outer ring; and
a rotating circular mirror set up on the fixed plane;
wherein the outer ring on the fixed plane and the rotating circular mirror form a comb-shaped driver; and
an angle between the rotating circular mirror and the fixed plane is changed by controlling a current inputting the driver.

13. The interactive spatial orientation system according to claim 10, wherein the microelectromechanical mirror is a two-dimension controllable microelectromechanical mirror; and the two-dimension controllable microelectromechanical mirror comprises:
a two-dimension rotating circular mirror; and
two outer rings nestedly set up on the position in which the two-dimension rotating circular mirror is located.

14. The interactive spatial orientation system according to claim 1, wherein the processing apparatus comprises a processing side wireless transceiver and a calculation processor; wherein the processing side wireless transceiver is electrically connected with the calculation processor.

* * * * *